No. 898,194.
PATENTED SEPT. 8, 1908.
C. L. DAVIS.
AUTOMATIC GOVERNOR FOR PNEUMATIC MOTORS.
APPLICATION FILED JULY 27, 1905.
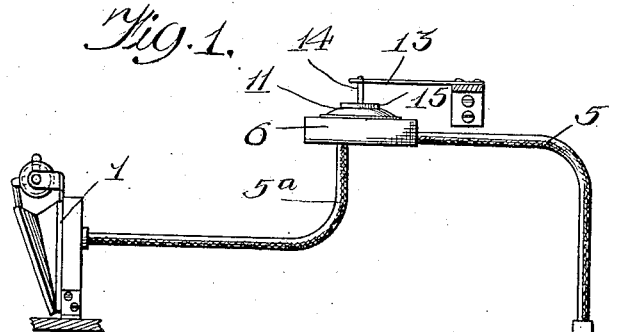
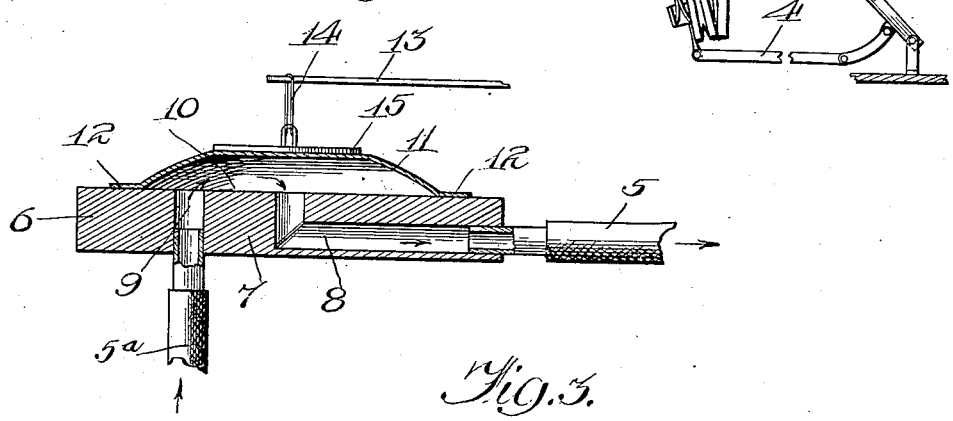
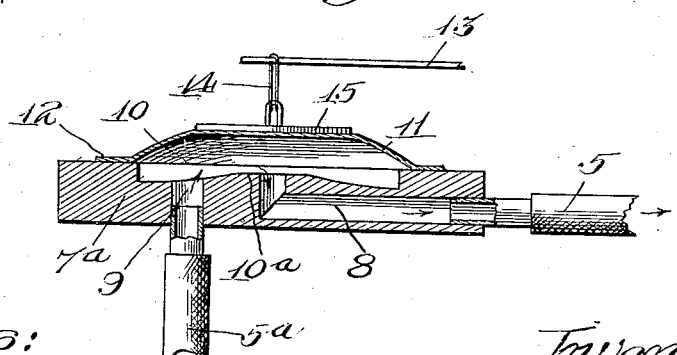
Witnesses:
Inventor:
Charles L. Davis

UNITED STATES PATENT OFFICE.

CHARLES L. DAVIS, OF DETROIT, MICHIGAN.

AUTOMATIC GOVERNOR FOR PNEUMATIC MOTORS.

No. 898,194.  Specification of Letters Patent.  Patented Sept. 8, 1908.

Application filed July 27, 1905. Serial No. 271,409.

*To all whom it may concern:*

Be it known that I, CHARLES L. DAVIS, a citizen of the United States, residing at Detroit, in the county of Wayne and State of Michigan, have invented a certain new and useful Improvement in Automatic Governors for Pneumatic Motors, of which the following is a full, clear, concise, and exact description, reference being had to the accompanying drawings, forming a part of this specification.

My invention relates to automatic governors for pneumatic motors.

The principal object of the invention is to provide a simple, practical and effective device for automatically controlling the speed of a pneumatic motor to maintain the same uniform, or practically uniform.

In the accompanying drawings, Figure 1 is a view, largely diagrammatic, of a pneumatic motor and wind-inducing apparatus therefor, and a pneumatic governor for controlling the motor, embodying my present invention; Fig. 2 is a longitudinal section of the governor; Fig. 3 is a similar view of a modified form of governor.

Referring first to Fig. 1, I have shown a motor 1 which can be of any suitable or desired construction. As this forms no part of my present invention, I have not illustrated it in detail. 2 represents the usual or any form of bellows or wind-inducing apparatus, and 3 and 4 represent the pedal and connections by which the bellows 2 is operated. Leading from the bellows 2 is a duct or tube 5 by which the air is drawn or exhausted from the motor 1 to cause the rotation thereof. This duct 5 is provided with an automatic governor 6 embodying my invention and adapted to control the wind current from the motor so as to maintain the speed of the same constant or substantially constant. This governor is illustrated in detail in Fig. 2. It consists of a block or board 7 of any suitable construction, having ducts or passages 8 and 9, with the former of which the tube 5 leading from the wind-inducing apparatus 2 is connected, and with the latter of which the extension 5ª of said duct leading to the motor is connected. Both of these ducts 8 and 9 open on the same side 10 of the block 7. A flexible diaphragm 11 is secured to this face 10 of the block 7, as by gluing or tightly screwing the edge or rim 12 thereof to said block. This diaphragm covers the openings of both of the passages 8 and 9 and forms a closed space through which passes the wind drawn from the motor 1 by the wind-inducing apparatus 2. A spring 13 is connected by a string 14 or other suitable connection, with the diaphragm 12. This spring 13 tends always to draw and maintain the diaphragm 11 in an outward or expanded condition. If desired, a stiffener 15 in the form of a piece of wood or leather can be secured, as by gluing to the outside of the diaphragm 11, although this is not at all essential to the invention. In this way the operation of the governor, is that when the bellows 2 is operated to produce a wind current to operate the motor 1, the diaphragm 11 will be slightly collapsed by the outside air acting upon the chamber formed by the diaphragm in which there is a more or less vacuous condition. If the bellows is operated more violently or strongly so as to induce a greater wind current and thereby exhaust the air more fully from the interior of the diaphragm 11, the latter will be more collapsed by the atmospheric pressure, thereby restricting the windway opening formed by said diaphragm and reducing the wind current from the motor, thereby maintaining the same at substantially the same speed as before. If, on the contrary, the bellows is actuated less strongly, the vacuous condition in the diaphragm is less intense, thereby allowing a greater wind current to pass through the windway and still maintaining the same speed of the motor. In this way, although the wind pressure may be greatly varied from very little to very considerable, the diaphragm automatically collapses or expands and thereby automatically regulates the wind current from the motor so as to maintain a constant speed on the part of the latter.

In Fig. 3 I have shown a slightly modified construction in which the face 10ª of the block 7ª is slightly depressed to permit a greater collapse of the diaphragm 11 and a practical closure of the bellows passage 8 without closing the motor passage 9. The bellows passage 8 is more or less closed by the diaphragm, while the motor passage 9 always remains wide open.

It will be understood that changes and modifications can be made in the devices herein set forth, without departing from the spirit of the invention.

What I claim is:—

1. The combination with a vacuum producing apparatus, and a motor to be actuated thereby, of a motor controller for controlling the speed of the motor, said motor controller being provided with connections extending to the vacuum producing apparatus, and to the motor, and comprising a block having two ports in its face, one of said ports leading to the motor and the other to the vacuum producing apparatus, and a flexible diaphragm arranged over both of said ports and secured to the face of the block in which the ports open so as to cover both ports, a disk arranged centrally of the diaphragm so that there is a portion of the diaphragm on all sides of the disk between the same and the block, and spring means for holding the diaphragm away from the block.

2. A pneumatic controller, comprising a block having two passages, both of which open in the same face of the block, said face being depressed so as to form a depressed seat, and a flexible diaphragm secured to said block and covering said depressed face thereof.

In witness whereof, I hereunto subscribe my name this 21st day of July A. D., 1905.

CHARLES L. DAVIS.

Witnesses:
CHAS. R. WILENOTH,
CARRIE W. HALEY.